(12) United States Patent
Negishi et al.

(10) Patent No.: US 6,504,089 B1
(45) Date of Patent: Jan. 7, 2003

(54) SYSTEM FOR AND METHOD OF SEARCHING MUSIC DATA, AND RECORDING MEDIUM FOR USE THEREWITH

(75) Inventors: Hirokazu Negishi, Yokosuka (JP); Kenichi Nagasawa, Yokohama (JP); Yoshisuke Teshima, Yokohama (JP); Toshihiro Sugikubo, Sakurashin-machi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/217,133

(22) Filed: Dec. 21, 1998

(30) Foreign Application Priority Data

Dec. 24, 1997 (JP) .............................. 9-355024
Dec. 25, 1997 (JP) .............................. 9-357276

(51) Int. Cl.$^7$ ........................... A63H 5/00; G04B 13/00; G10H 7/00
(52) U.S. Cl. .......................... 84/609; 84/615
(58) Field of Search .................... 84/600–602, 609, 84/615; 434/307 A

(56) References Cited

U.S. PATENT DOCUMENTS

| 5,636,276 A | * | 6/1997 | Brugger |
| 5,703,308 A | * | 12/1997 | Tashiro et al. |
| 5,739,451 A | * | 4/1998 | Winksy et al. |
| 5,874,686 A | * | 2/1999 | Ghias et al. |
| 5,895,876 A | * | 4/1999 | Moriyama et al. |
| 5,930,768 A | * | 7/1999 | Hooban .................. 705/27 |
| 5,963,916 A | * | 10/1999 | Kaplan |
| 5,963,957 A | * | 10/1999 | Hoffberg |
| 6,263,313 B1 | * | 7/2001 | Milsted et al. ........... 705/1 |
| 6,385,596 B1 | * | 5/2002 | Wiser et al. ............ 705/51 |
| 6,389,538 B1 | * | 5/2002 | Gruse et al. |

FOREIGN PATENT DOCUMENTS

| JP | 62-100092 | 5/1987 |
| JP | 63-29827 | 2/1988 |

(List continued on next page.)

*Primary Examiner*—Jeffrey Donels
(74) *Attorney, Agent, or Firm*—Fitzpatrick, Cella, Harper & Scinto

(57) ABSTRACT

A music search system easily operable by a user to search for a musical piece with accuracy, a method for operating the system, and a recording medium for use with the system. A plurality of music search factors can be successively input to the system, and one or more candidate pieces are presented based on effective inputs in the input music search factors. A user can efficiently supply the system with various sorts of music search information, and can obtain an optimal search result by using a search method particularly suitable for search by each sort of information. Input score information is reproduced according to the input operation, so that the user can immediately confirm most ambiguous score information when using the score information as search information, thereby reducing the probability of the system making an unnecessary search. A presentation form in which a candidate piece is displayed can be selected from a plurality of forms, thereby enabling the user to recognize candidate pieces in various forms, from which the user will select necessary one by various methods. Thus, the user can select any musical piece in an optimal way according to his or her preference. The degrees of matching of a plurality of candidate pieces to each of musical piece search factors are evaluated and information relating to the evaluation results is simultaneously displayed, thereby suggesting, to a user, musical pieces from which one searched for by the user is probable to be found. Also, the system is substantially free from selecting failure.

13 Claims, 12 Drawing Sheets

FOREIGN PATENT DOCUMENTS

| | | |
|---|---|---|
| JP | 1-114984 | 5/1989 |
| JP | 2-54300 | 2/1990 |
| JP | 2-202621 | 8/1990 |
| JP | 2-216687 | 8/1990 |
| JP | 3-12890 | 1/1991 |
| JP | 3-12891 | 1/1991 |
| JP | 4-3097 | 1/1992 |
| JP | 4-181457 | 6/1992 |
| JP | 5-61927 | 3/1993 |
| JP | 6-301734 | 10/1994 |
| JP | 7-5887 | 1/1995 |
| JP | 7-121566 | 5/1995 |
| JP | 7-287713 | 10/1995 |
| JP | 8-63481 | 3/1996 |
| JP | 8-129393 | 5/1996 |
| JP | 8-160975 | 6/1996 |
| JP | 8-227297 | 9/1996 |
| JP | 9-138691 | 5/1997 |
| JP | 9-258729 | 10/1997 |
| JP | 9-293083 | 11/1997 |

\* cited by examiner

FIG. 12

DO YOU WANT TO HEAR WHOLE TUNE ??

| | |
|---|---|
| TITLE | ◆◆◆◆◆◆◆ |
| NAME OF ARTIST | ▽▽▽ ▽▽▽ |
| COMPOSER | ★★ ★★ |
| LYRICIST | ● ● ● |
| DISTRIBUTOR | ＊＊＊＊＊＊＊ : : |
| RELEASE DATA | DECEMBER 31, 1997 |
| GENRE | FUSION |

43

| | |
|---|---|
| USED DATA BASE | XXXXXX |
| DOWNLOAD WAIT TIME | 2 MIN |
| COST | 50 YEN |

47

CANCEL — 38

PERFORM — 39

SYSTEM FOR AND METHOD OF SEARCHING MUSIC DATA, AND RECORDING MEDIUM FOR USE THEREWITH

BACKGROUND OF THE INVENTION

1. Field of the Invention

The present invention relates to a system for searching for musical pieces, to a method of searching for musical pieces, and to a recording medium therewith. More particularly, the present invention relates to a musical piece search system for selecting, from information containing a multiplicity of musical pieces, a musical piece which a user cannot remember or does not know, and for presenting the musical piece searched for to the user, and also relates to a musical piece search method for performing such a process, and to a computer-readable recording medium therewith.

2. Description of the Related Art

For identification of a tune or guessing the name of a musical piece, as in a quiz, enormous memory, advanced capabilities of association and judgement and so on, such as are possible only in human brains, have been required.

Recently, with the reduction in the price of music software and with the diversification of people's tastes in music, the number of musical pieces remaining in people's memory or available in industry has increased steadily. Under these circumstances, a person may have a feeling of being frustrated if he or she cannot remember the name of a song he or she wants to sing using a karaoke system, and may feel it is difficult to select a musical piece for the purposes of diversion of mind or advertisement. In view of this problem, technicians have set the identification of a musical piece as an object of study.

In particular, musical instrument digital interface (MIDI) techniques, with which certain uses for computers in the field of music have been specified, have come into wide use in the karaoke industry to supply, or communicate, music data (referred to as communication karoke, hereinafter) to karoke enthusiasts, as well as to enable karaoke systems to be used in various ways. Many music search techniques suitable for karoke systems have recently been reported.

For example, Japanese Patent Laid-Open Publication No. 2-54300 ("Automatic Music Selecting Apparatus") discloses a technique for selecting a karaoke piece by melody. Japanese Patent Laid-Open Publications Nos. 3-12890 and 3-12891 also disclose similar techniques. Japanese Patent Laid-Open Publication No. 5-61927 ("Music Data Base Search System and Melody Matching Method Using Melody Information") discloses a technique with consideration of errors in placement, omissions, extraneous musical notes, etc., presented by a user.

Japanese Patent Laid-Open Publication No. 7-121556 ("Music Information Searching Apparatus") discloses a technique with consideration of the fact that users do not always input melodies in scales based on an absolute pitch.

On the other hand, over time, new techniques have appeared for music search, accompanying the advancement in technology and the popularization of the above-mentioned communication karaoke based on MIDI techniques. For example, Japanese Patent Laid-Open Publication No. 8-129393 ("Karaoke Apparatus") discloses a technique of performing communication karaoke music selection immediately from a voice input by using a MIDI technique. Japanese Patent Laid-Open Publication No. 8-160975 ("Karaoke Music Selecting Apparatus") discloses a technique intended to increase the music selection hit rate by using the relative lengths or proportions of melody, rhythm, lyric lines, etc., as factors. Further, Japanese Patent Laid-Open Publication No. 9-138691 ("Musical Piece Searching Apparatus") discloses a technique of using the pitch and the length of notes as factors.

Needless to say, essentials of these musical search techniques may be applied to other uses. Practically speaking, however, they are mainly intended for karaoke. There has also been made a noteworthy technical disclosure in Japanese Patent Laid-Open Publication No. 2-202621 ("Musical Piece Searching Apparatus Using Musical Performance Information"), describing a musical piece searching apparatus capable of searching for a musical piece through musical information not on melody but on instrumental formation, rhythmical sense, etc. In this publication, the reason for use of information on instrumental formation, rhythmical sense, etc. instead of melody information is explained by saying "Melody is thought to be essential to a song part or a solo instrument part, and karaoke performance information lacks information of such parts and cannot be searched".

Further, with the rapid advancement of general computer techniques, particularly of acoustic analysis techniques, frequency identification techniques including the above-mentioned one disclosed in Japanese Patent Laid-Open Publication No. 7-121556 have been put on the market as personal computer software.

Various musical piece search techniques have been disclosed as described above, but very few of them have been put to practical use heretofore. This is thought to signify that some hidden obstacles still exist despite the rapid advancement of technologies. Possible causes of the lack of success will be discussed briefly.

It is believed that a melody is memorized as a pattern of music information in the right brain (known as the "sense" brain hemisphere). On the other hand, it is said that bibliographical information, such as titles of musical pieces, and information of related matters are memorized as linguistic information in the left brain (known as the "logic" brain hemisphere. Information on music, which is conceived as a single event, is therefore considered to be memorized in separate right and left brain hemispheres. This is thought to be a cause of the difficulty of not remembering a name while remembering a melody.

Therefore, the essential valuable content of music is held by the right brain, and information of the name, popularity, etc., held by the left brain is a secondary matter. This also supports the supposition that the reliability of matching between relating information provided from the left brain and information in the right brain is low. However, there is a possibility of a musical piece being permanently fixed in a person's memory together with an unforgettable personally experienced event, with only a name of the musical piece forgotten. Only the title of the musical piece may be forgotten in such a case.

From bibliographical information alone, no right-brain information is produced about a melody. The probability that various sorts of information relating to a musical piece will be full of ambiguities is high. It can therefore be said that the functions of inference engines used today in natural language processing have not been used to full effectiveness in conventional systems. In particular, the methods using a certain information input such as a voice input are not making the best use of the techniques for natural language and melody recognition.

There is another problem relating to the field where a search system is used, i.e., in a karaoke environment. The characteristic atmosphere of karaoke, i.e., a space full of loud sounds, is influential. People have great difficulty in inputting correct information in such an environment.

Further, MIDI techniques themselves entail a problem of absence of melody most useful in ordinary MIDI information. This problem has already been pointed out in the above-mentioned Japanese Patent Laid-Open Publication No. 6-202621 ("Musical Piece Searching Apparatus Using Musical Performance Information"). However, it is uncertain how many users could use, as search input information, instrument formation information and information obtained by rhythmical sense, which are keys to the search, and how accurate the search will be.

SUMMARY OF THE INVENTION

In view of the above-described problems of the conventional art, it is an object of the present invention to provide a music search system easily operable by a user with an effect of searching for a musical piece with improved accuracy, a music search method for operating the system, and a recording medium for use with the system, contributing to the development of the music distribution industry.

To achieve this object, according to one aspect of the present invention, there is provided a music search system comprising dialogical input means for enabling a plurality of musical piece search factors to be input successively, and means for presenting at least one candidate piece based on an effective input in the plurality of musical piece search factors input by the input means.

A user can efficiently supply the thus-arranged system with various sorts of information for searching for a musical piece, and can obtain an optimal search result by using a search method particularly suitable for search by each sort of information.

According to another aspect of the present invention, there is provided a music search system comprising input means for inputting information relating to a score of the musical piece as a musical piece search factor, reproducing means for reproducing the score information input by the input means according to the input operation of the input means, and means for presenting at least one candidate piece based on the score information input by the input means.

This arrangement ensures that a user can immediately confirm most ambiguous score information when using the score information as search information, thereby reducing the probability of the system making an unnecessary search.

According to still another aspect of the present invention, there is provided a music search comprising input means for inputting at least one musical piece search factor, access means capable of accessing a data base in which a multiplicity of musical piece information items are stored, presentation means for presenting at least one candidate piece from the multiplicity of musical piece information items, and selecting means for selecting a presentation form for said presentation means from a plurality of forms.

This arrangement enables a user to recognize candidate musical pieces in various forms, from which the user will select, by various methods, one which he or she needs. Thus, the user can select any musical piece in an optimal way according to his or her preference.

According to a further aspect of the present invention, there is provided a music search system comprising input means for inputting at least one musical piece search factor, access means capable of accessing a data base in which a multiplicity of musical piece information items are stored, and presentation means for presenting a plurality of candidate pieces from the multiplicity of musical piece information items based on the musical piece search factor input by the input means, wherein the presentation means evaluates degrees of matching of the plurality of candidate pieces to the musical piece search factor, and simultaneously displays information about results of the evaluation and character information relating to the candidate pieces.

The thus-arranged system can suggest, to a user, musical pieces from which one searched for by the user is probable to be found. Also, the system is substantially free from selecting failure.

According to still a further aspect of the present invention, there is provided a music search system comprising input means for inputting at least one musical piece search factor, access means capable of accessing a data base in which a multiplicity of musical piece information items are stored, and presentation means for presenting at least one candidate piece from the multiplicity of musical piece information items based on the musical piece search factor input by said input means, wherein the presentation means displays a plurality of candidate pieces together with the musical piece search factor.

The thus-arranged system can suggest to a user redoing selection from the candidate pieces, thereby reducing user's chances of making an unnecessary search.

The foregoing and other objects, advantages, and features of the present invention will become more apparent from the following detailed description of preferred embodiment taken in conjunction with the accompanying drawings.

BRIEF DESCRIPTION OF THE DRAWINGS

FIG. 12 is a diagram showing a whole-tune-performance designation window.

DESCRIPTION OF THE PREFERRED EMBODIMENT

An embodiment of the present invention will be described in derail with reference to the accompanying drawings.

The present invention will first be outlined. The inventors recognized that the absence of a suitable user interface, particularly a dialogical multimedia interface is the most important consideration and, from this recognition, adopted a method of using a dialogical process in which a user is requested to sequentially input data items for a search. Examples of search inputs, i.e., data items input to enable searching for a musical piece, are score information, such as melody and rhythm, bibliographical information, such as a name of a composer, a name of a lyricist, a part of a text, and words which denote senses.

The importance of a dialogical multimedia interface is explained below. To begin with, a user's need for making a search for the title of a musical piece from a melody or other information does not arises without a considerable reduction in the user's memory, and it is to be presupposed that the reliability of a search input itself, provided by the user, is uncertain. It is also necessary to consider the probability that main users will be not those who are accustomed to the newest techniques but those who are unfamiliar with mechanisms.

Therefore, it is important to set inputs with redundancy in every respect. This leads to a conclusion that a dialogical input means for advancing a dialogical process according to the contents of inputs is indispensable. The development of input means in the form of a dialogical multimedia interface is now considered to have reached the stage of providing a practical one, thanks to the development of natural language processing techniques in the field of artificial intelligence and to the development of display techniques.

Score information is considered to be most important in information obtained from a user's memory and to be considerably ambiguous. The efficiency of search can be improved by using score information as a search input and by immediately identifying and reproducing a melody or rhythm which is to be used as information for the search.

Figure 1:
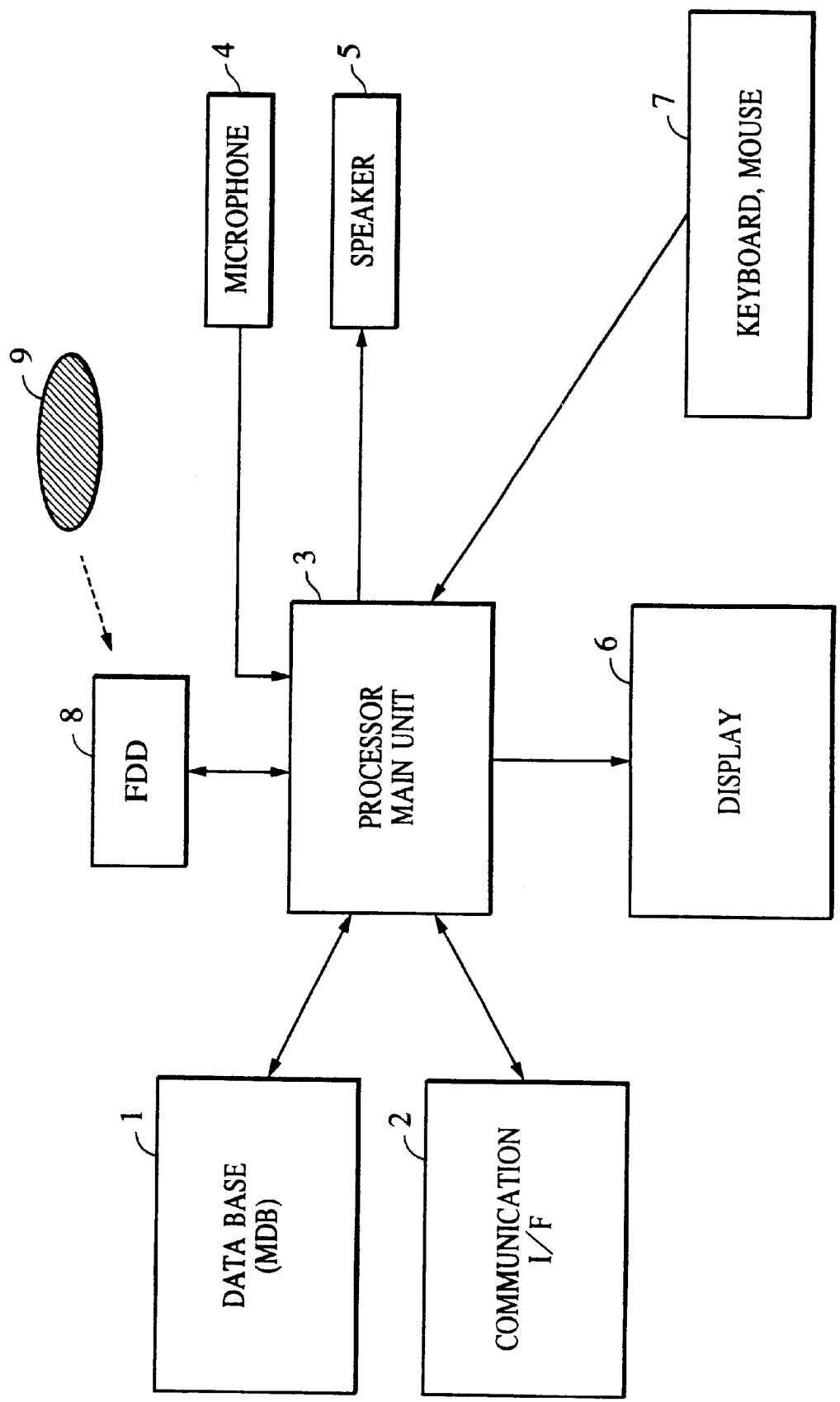
FIG. 1 is a block diagram showing the configuration of an entire music search system which represents an embodiment of the present invention.

FIG. 1 is a diagram showing the overall configuration of a music search system which represents an embodiment of the present invention. A music data base (MDB) 1 is provided in the music search system of this embodiment. A communication interface (I/F) is provided for connection between the music search system and an external MDB. It is to be understood here that the internal MDB and the external MDB constitute an MDB in the entire system. The internal MDB and the external MDB are connected to a processor main unit 3 which includes a central processing unit (CPU).

Referring also to FIG. 1, the system includes a microphone 4 which is used by a user to input words or a melody, a speaker 5 for reproducing a performance of a musical piece selected from the MDB or for reproducing score information (melody, rhythm, etc.) input as a search input, a display 6 for displaying a dialogical input window, bibliographical information and images relating to musical pieces which may be searched for, an operating device 7 such as a keyboard or a mouse for inputting various data items by accessing a search window displayed on the display 6. Each of these components is arranged so as to be capable of unidirectional supply of data to or from the processor main unit or bidirectional exchange of data with the processor main unit.

The system shown in FIG. 1 also includes a floppy disk drive (FDD), which reads a program written on a floppy disk (FD) as software for operating the system, and sends the read program to the processor main unit 3. The program written on the FD and input to the processor main unit 3 is transferred to a hard disk or a semiconductor memory provided in the processor main unit 3. An operating process having steps shown in FIG. 4 can be performed in accordance with this program.

Figure 2:
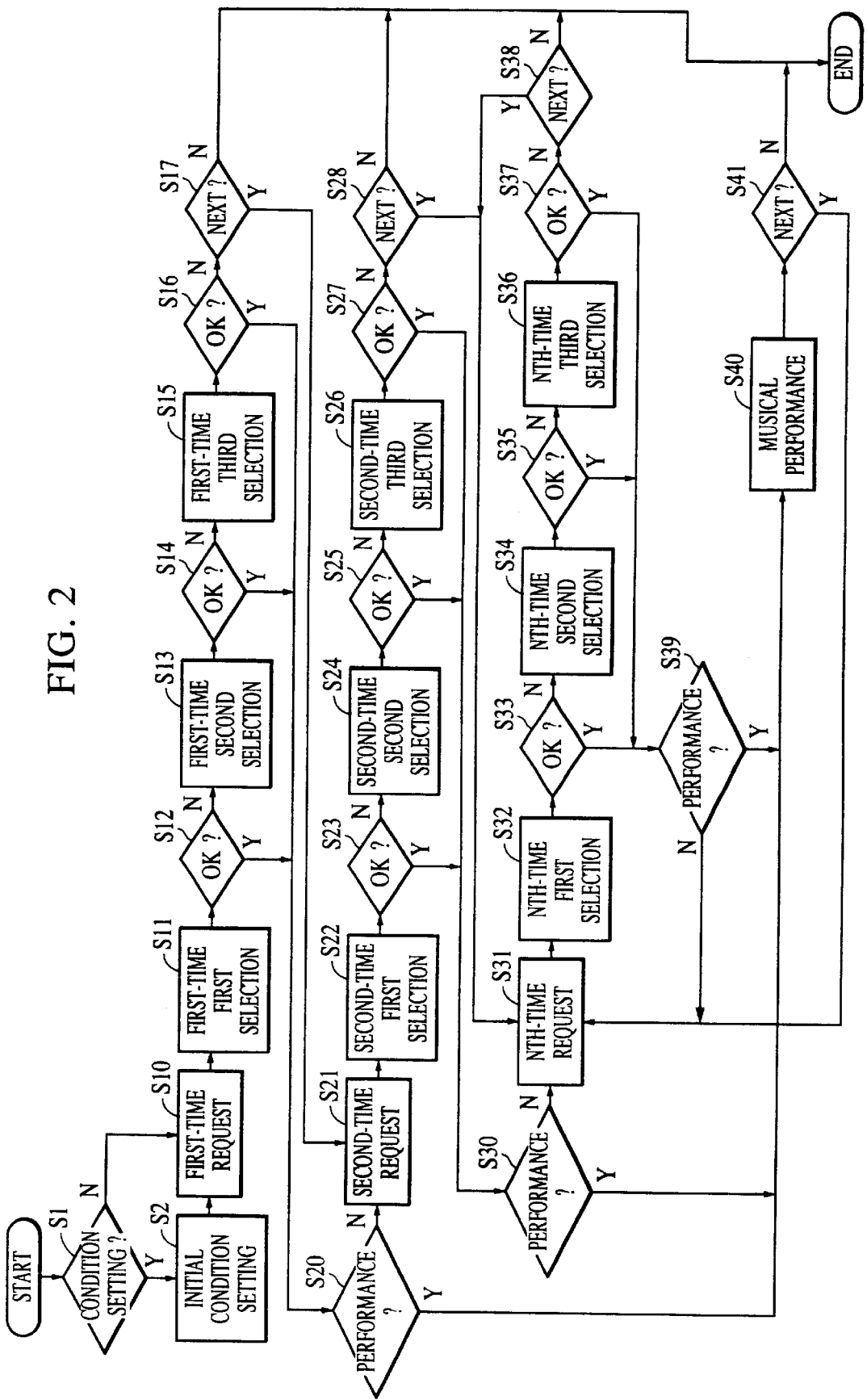
FIG. 2 is a flowchart of the operation of the entire system sown in FIG. 1.

FIG. 2 is a flowchart of a basic process in which the system shown in FIG. 1 operates. The overall operation of this embodiment will be described with reference to FIG. 2. When the system is started to operate, the internal MDB 1 is set up, made active, and made to perform self diagnosis. The internal MDB 1 is thereafter held under the control of the CPU in the processor main unit 3. On the other hand, access to the external MDB via the external interface is enabled, and communication with the external MDB is performed to confirm that the external MDB is also operable under the control of the CPU or accessible. Also, the CPU activates the display 6, the microphone 6, the speaker 5 and the operating device 7.

When the start of the system is confirmed, an initialization routine S2 is started if the system is set up for the first time. If the present start of the system is not a first-time start, a user is asked in step S1 through the dialogical interface whether he or she will perform initialization. If the user requires initialization, the initialization routine is started to perform initialization.

In the initialization routine, the user is asked in a dialogical process to select, for example, a search input which is to be selected with priority and a method of outputting a search result. If the user wishes to minimize the amount of user setting work in the initialization routine, default values are set. The initialization routine will be described below in detail.

Next, the CPU accepts a first request (S10). The CPU repeats request processing while presenting a plurality of candidate musical pieces according to an input from the user, and advances the process into a musical piece selecting routine (S11) as occasion arises. The request routine and the selecting routine will also be described below in detail.

In the selecting routine (S11), the user selects one of the presented candidate musical pieces, and a melody line of the musical piece thereby selected is presented together with reference information such as an image. The user then makes a determination as to whether the presented musical piece is the one that the user desires or wishes to hear. In the case of "Yes", the user is asked whether he or she requires performance of the whole tune (S20).

The above-described selecting routine and determination as to whether a presented piece is a suitable one can be repeatedly performed three times (S11 to S16). If the desired piece is found in the three cycles of the selecting routine and determination, the user is asked whether he or she requires performance of the whole tune (S20). If the desired piece is not found in the three cycles, the user is asked whether processing for the next request should be performed (S17). If the user makes the next request, the same processing is performed from steps S21 to S28, and further similar steps represented by steps S31 to S35 are repeatedly performed until the user inputs a processing termination command. That is, request, selection, and trial hearing may be repeated until the desired musical piece is found. In this embodiment, default values set by the above-mentioned condition setting are such that the number of musical pieces successively presented is three. However, the number of musical pieces can be freely set according to a user's preference.

If the user selects, in step S20, S30, or S39, performance of the entire length of a musical piece selected by the selecting routine, a musical performance routine (S40) is started and the CPU accesses the internal MDB 1 or the external MDB and outputs the desired musical piece through the speaker 5. If there is an image corresponding to the musical piece, the CPU displays the image on the display 6.

Needless to say, if the user determines to make the next request in step S41 after the performance of one musical piece in the musical performance routine (S40), a transition to the next request routine can be made. If, in step S17, S28, S38, or S41, the user selects making no request, the operation of the system is stopped and the process is terminated.

Each step of the above-described process will next be described in more detail. The system initialization routine (S2) will first be described with reference to the flowchart of FIG. 4 and to an illustration of a display window shown in FIG. 4.

Figure 3:
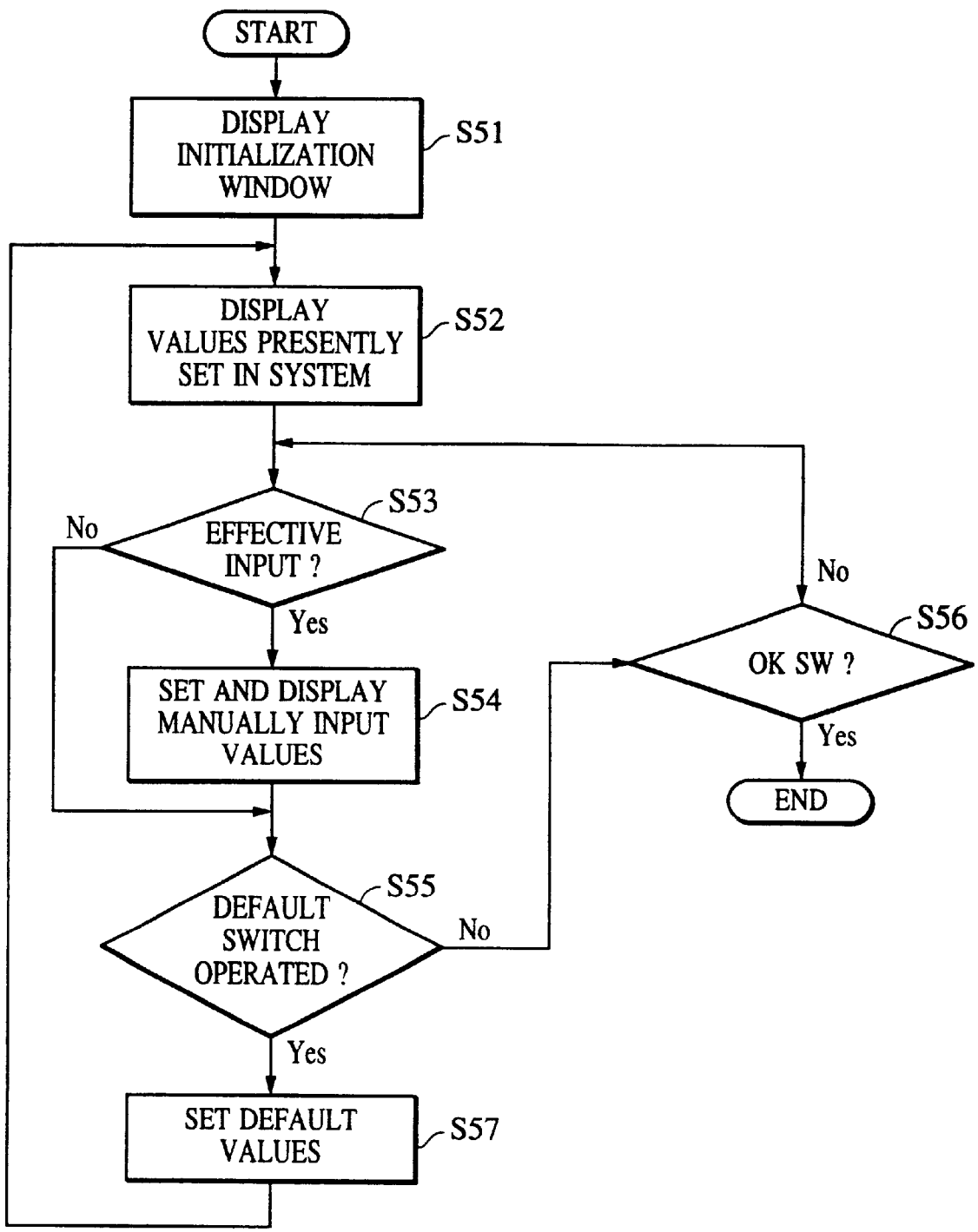
FIG. 3 is a flowchart of the operation in an initialization routine.
Figure 4:
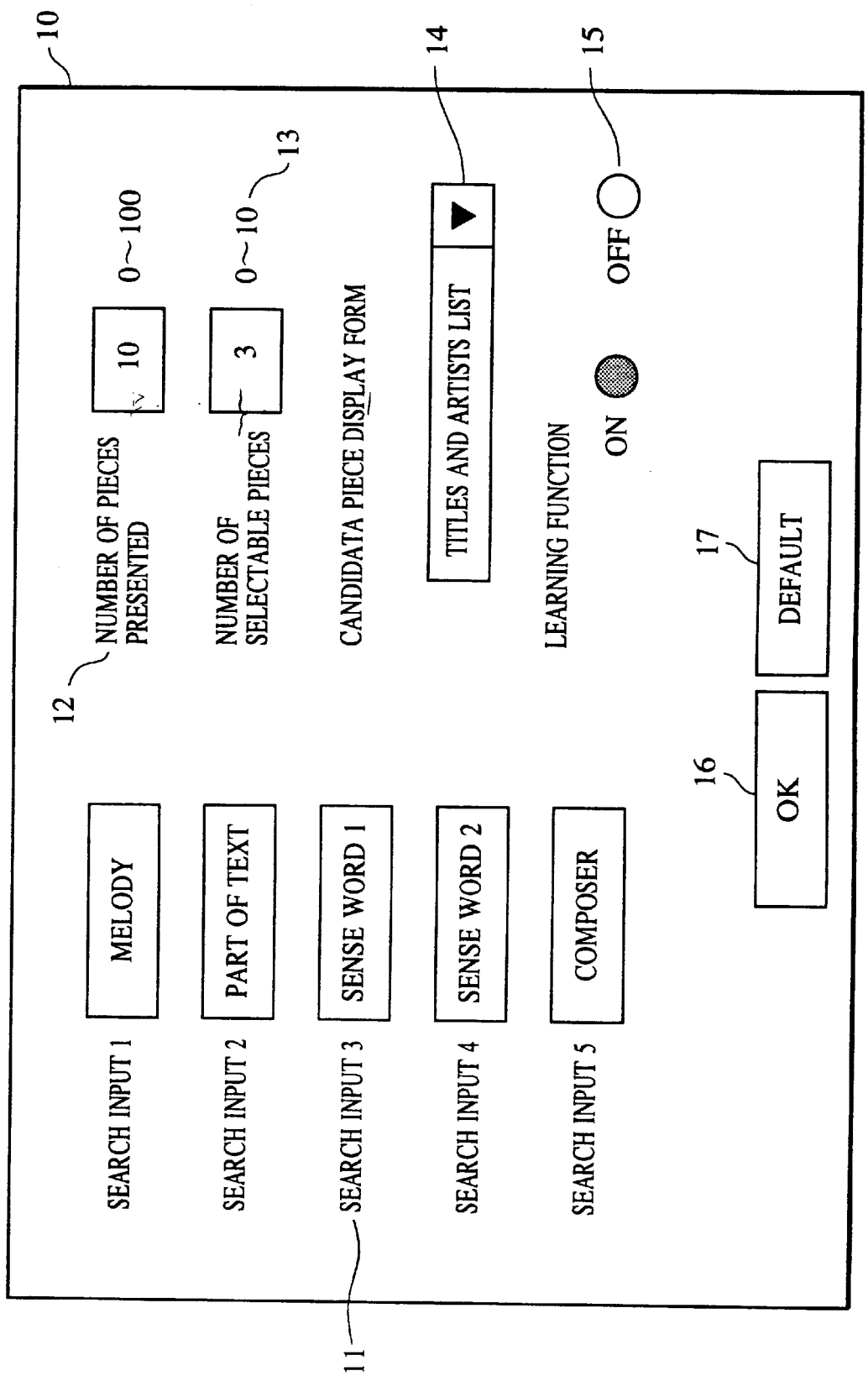
FIG. 4 is a diagram showing a window displayed in the initialization routine.

When the user designates setting for initialization in step S1 of the operation of the dialogical music search system shown in the flowchart of FIG. 2, or when the initialization routine in step 2 is started in the case where the system is started for the first time, an initialization window such as illustrated in FIG. 4 is displayed (in step S51 in FIG. 3). The display window shown in FIG. 4 has a search priority display portion 11, a presented musical piece number display portion 12, a selectable piece number display portion 13, a candidate piece display-form display portion 14, and a learning function on-off display portion 15.

In step S52, values presently set as system setting values are displayed. In the case where the system is started for the first time, the set values are default values determined before the start of the system. In the case where the user inputs a command in step S1 to start the initialization routine for the purpose of changing initialized values, the set values are values obtained by preceding initialization and by learning functions described below and presently held by the system. FIG. 4 shows a state where the default values are displayed in the system of this embodiment.

That is, in the system of this embodiment, "melody" is input as a search input with first priority and "part of a text", "sense word 1", "sense word 2", and "composer's name" are successively input in order as other search inputs. As a "sense word", a word which denotes a human sense such as a sense of a "gloomy" or "delightful" mood is input. "Sense words" of this kind are attached as keywords to all musical pieces contained in the MDB, and musical pieces with key words corresponding to input words are presented as candidate pieces as described below.

In this embodiment, the maximum of the number of musical pieces presented at a time is "10", the number of musical pieces selectable from the presented musical pieces is "3", and the candidate piece display form is limited to a list of titles and artist names. The number of presented pieces, the number of selectable pieces and the display form will further be described below. The system of this embodiment has a learning function, which is on in the default setting. The learning function in this embodiment comprises automatically performing statistical processing for recognizing the effectiveness of search inputs in the request routine, and enabling the order of search inputs selected afterward to reflect the results of the statistical processing.

Referring to FIG. 4, the user can input contents to the various setting display portions 11 to 15 according to his or her preference by using the mouse or the keyboard shown in FIG. 1. When inputting the desired contents is completed (S53), the input values are set and displayed in the various setting display portions (S54). When an OK switch 16 shown in FIG. 4 is clicked (S56), this initialization routine is terminated. If the user wants to reset the set values to the default values before terminating the process, he or she may click a default switch 17 (S55) to set the default values as system setting values (S57). The process then returns to step S52 to perform initialization again.

Figure 5:
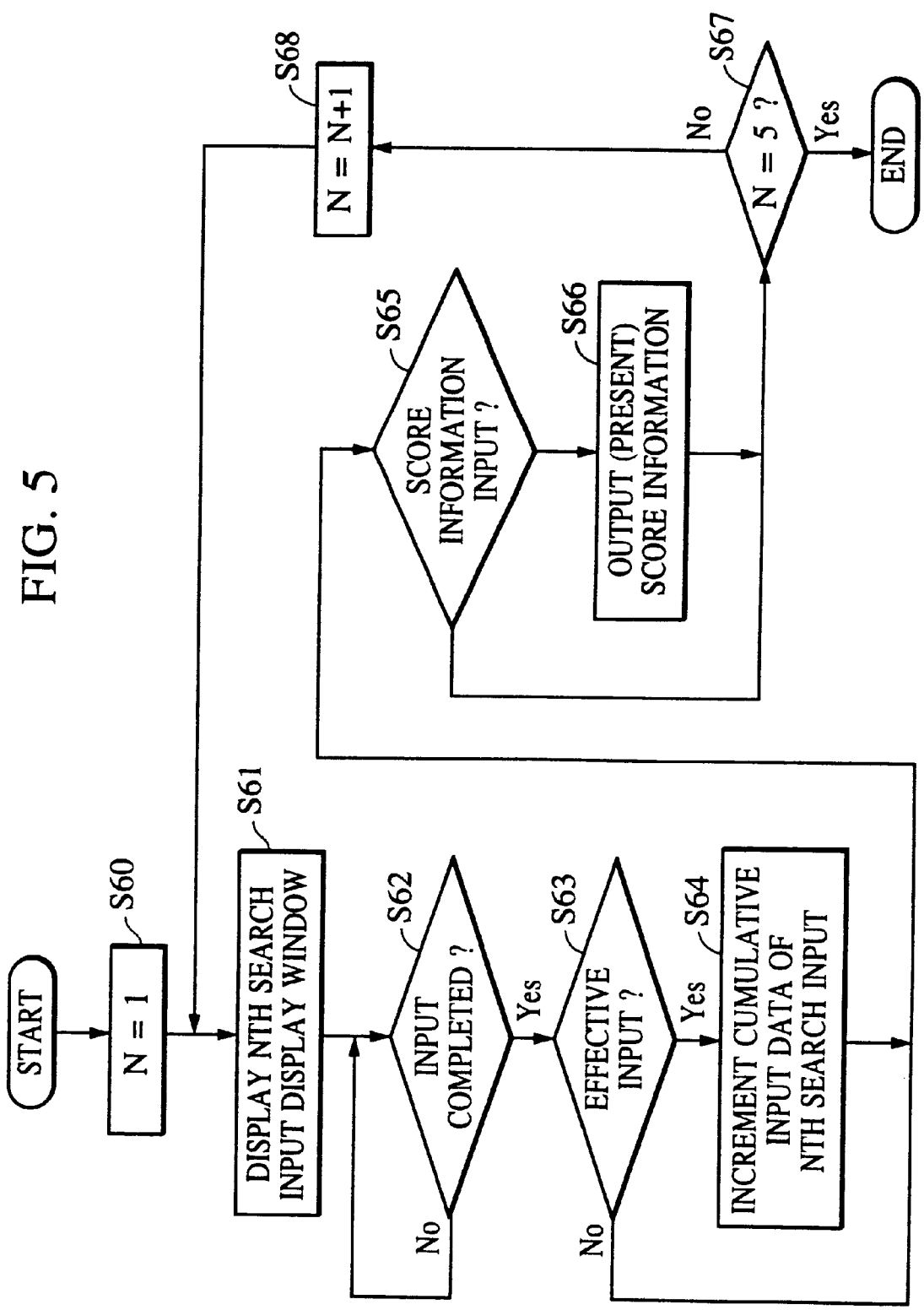
FIG. 5 is a flowchart of the operation in a request routine.
Figure 6:
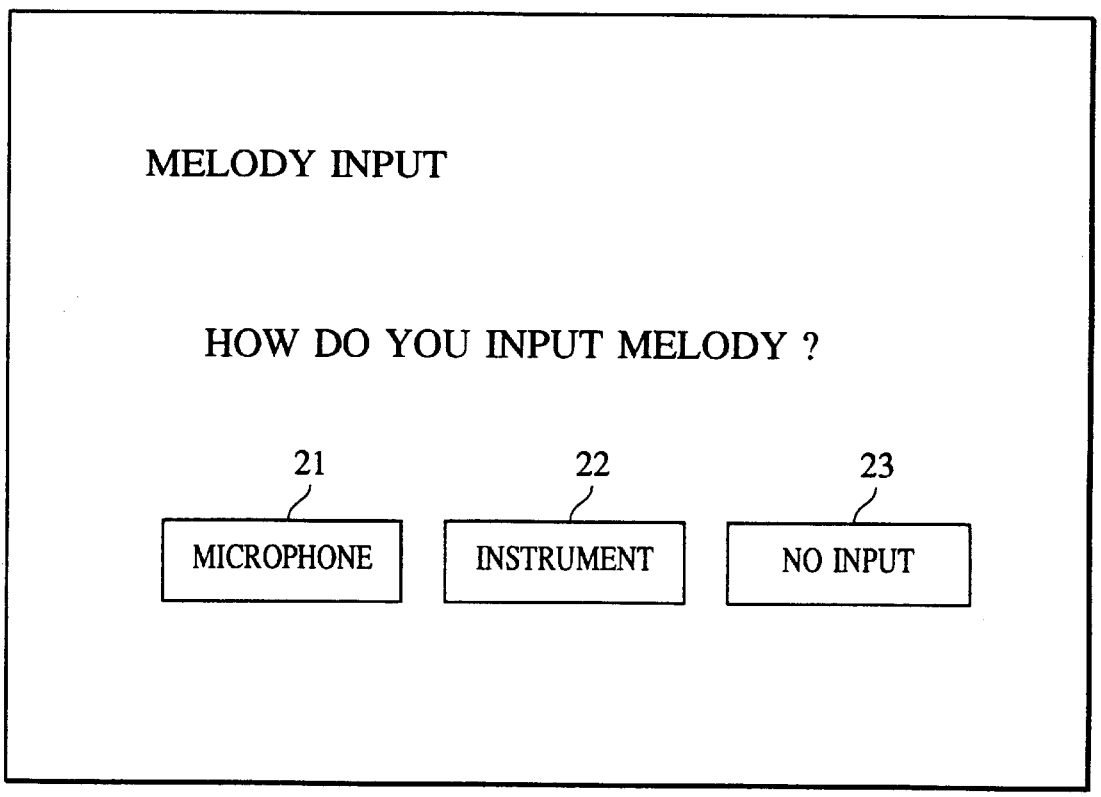
FIG. 6 is a diagram showing a window for designating a melody input method in the request routine.
Figure 7:
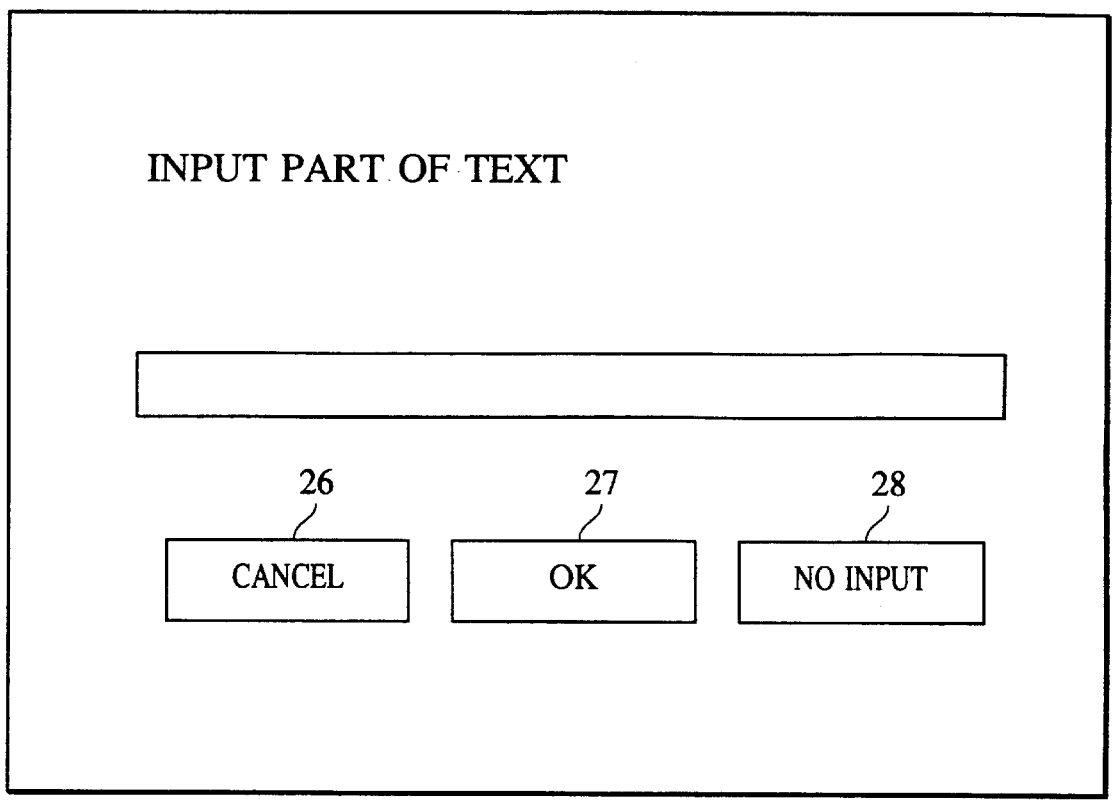
FIG. 7 is a diagram showing a words inputting window used in the request routine.

The request routine will next be described with reference to FIGS. 5 to 7. FIG. 5 is a flowchart showing the operation of the system in the request routine (S10, S21, S31) shown in FIG. 2. FIGS. 6 and 7 are diagrams showing examples of windows displayed on the display 6 in the request routine.

In the request routine, a variable N is first set to 1 (S60) to display an Nth search input window on the display 6. In this embodiment, as is apparent from the number of search input items (search factors) in the initialization window shown in FIG. 4, five search factors are successively set. However, the number of search input factors itself can be freely set in the system configuration. As one or more of the five search factors, "composer's name" and any other bibliographical information can be used as well as score information, such as "melody", "rhythm", and "part of a text", and words which denote senses, as described above.

Examples of bibliographical information usable as search input factors are "female voice/male voice/duet/chorus", "genre", "used instrument (band/piano/orchestra or the like)", "release date (the day or the day and month may be omitted)", "lyricist", "arranger", "record company", and "album title". The user may preliminarily enter relating information with which he or she associates each musical piece. Such relating information can also be used as a search input factor.

A first search input window is displayed (S61). If, for example, a first search input (search factor) is "melody", a display such as shown in FIG. 6 is made on the display 6. In step S62, a melody is actually input. In this embodiment, a method of inputting a melody can be selected in step S62. That is, if a key 21 shown in FIG. 6 is clicked, inputting a melody by voice through microphone 4 is selected. If a key 22 is clicked, inputting a melody by playing an electronic instrument connected to the processor main unit 3 by a connector (not shown) is selected. If a key 23 is clicked, inputting no melody, i.e., using no melody as a search factor, is selected.

Thereafter, a display "INPUT MELODY" is made on the display 6. When the user inputs a melody by one of the above-described methods, this input is set as a search factor. After the completion of this input, if the input is recognized as effective (S63), the number of effective search inputs corresponding to the search factor, previously accepted, is incremented (S64). The cumulative numbers of inputs of the groups of search factors (search inputs) are compared with each other, and search inputs 1 to 5 are determined according to the order from the largest cumulative number to the smallest cumulative number, and are stored as values in the system setting values described above with respect to step S52 shown in the flowchart of FIG. 3.

In this embodiment, if the input information is score information, such as that described above, including "rhythm", "melody", and "part of a text", etc., processing for analyzing the information and for removing ambiguities in terms of score information is performed. Needless to say, there is a possibility of the results of the analysis not according with the user's intention expressed by the inputs or differing from the actual score. In this embodiment, if it is determined that the input information is score information (S65), an output in accordance with the score determined by the results of analysis of the score information is presented through the speaker 5 to feed back the results of analysis to the user, thereby enabling the user to confirm whether the score information input by the user will be used as information for searching in accordance with his or her intention. In step S66, the user can cancel the input information used as a search input if the information differs from the input that the user intended to input, although this operation is not clearly shown.

The method for the above-mentioned analysis is based on known techniques disclosed in the above-mentioned publications and in other documents. Melody and rhythm input as data of relative intervals between tones, rhythm, relative lengths of notes, words, and relative changes in tone rows (same tones, descending tone row, ascending tone row) are analyzed by those techniques. If the number of such attributes of melody is larger, or if the accuracy of such data is higher, a reduced number of candidate pieces recognized as search targets can be selected with higher accuracy from the MDB.

FIG. 7 shows a display window in the case where "part of a text" is set as a search input item. As is apparent from FIG. 7, part of a text is input and an OK key 27 is clicked to enable the input text portion to be used. If a cancel key 26 is clicked, reinputting of information about the input text can be performed. If a key 28 is clicked, no "part of a text" will be used as a search input. Needless to say, a display window such as shown in FIG. 7 can also be used in the same manner at the time of inputting a sense word or bibliographical information.

When each search factor is input in this manner, N is incremented (S68). When N becomes equal to 5 (S67), the process is terminated.

In the above-described process, the search factor input order is determined by referring to the above-mentioned cumulative input number only. However, it is possible to presuppose that the user naturally knows his or her tendency in selecting the priority order as shown in FIG. 4, and the final input order may be determined by considering both the priority order first selected by the user and the priority order obtained by the above-described learning function on the system side. With respect to input of melody or the like, the above-mentioned cumulative value may be changed by considering the accuracy of melody input. Further, the cumulative value may be fed back to make the user to recognize his or her tendency in inputting and to thereby urge the user to reset the priority order to improve the process.

The embodiment has been described by assuming that only one user uses the system. If a plurality of users use the system of the present invention, initialization may be performed with respect to each user and statistical processing may be performed for use of the leaning function with respect to each user.

Musical pieces in the MDB to be searched will next be described. For example, in the Directory of Tunes issued in 1975 in England, essential melodies of 10000 pieces of classical music and 6000 popular songs are sorted only by relative changes in tone rows. Also, new communication karaoke systems are each maintaining 10000 or more entries in the form of MIDI information. Of pieces of classical music, impressive passages corresponding mainly to the first and second themes in each movement are used. In the case of popular music, various passages, such as an introduction or a beginning passage, a moving passage, and an ending passage, are used. Ordinary karaoke systems, having all tunes in the MIDI format, are capable of reducing the amount of data to a score level if memory compression is required.

Thus, the existing data bases have data units extracted in various ways according to categories of music, genres or the like. However, in any of the data bases, melodies which can remain easily in people's memory are mainly stored. In this embodiment, the sum of the above-mentioned numbers of musical pieces, i.e., 26000 pieces, is assumed to be the object of search in a typical melody data base. When the user successively inputs, in a dialogical process, several search factors, including a melody that the user wants to search for, several to several ten candidate pieces are selected from the 26000 pieces by using various known search methods.

Figure 8:
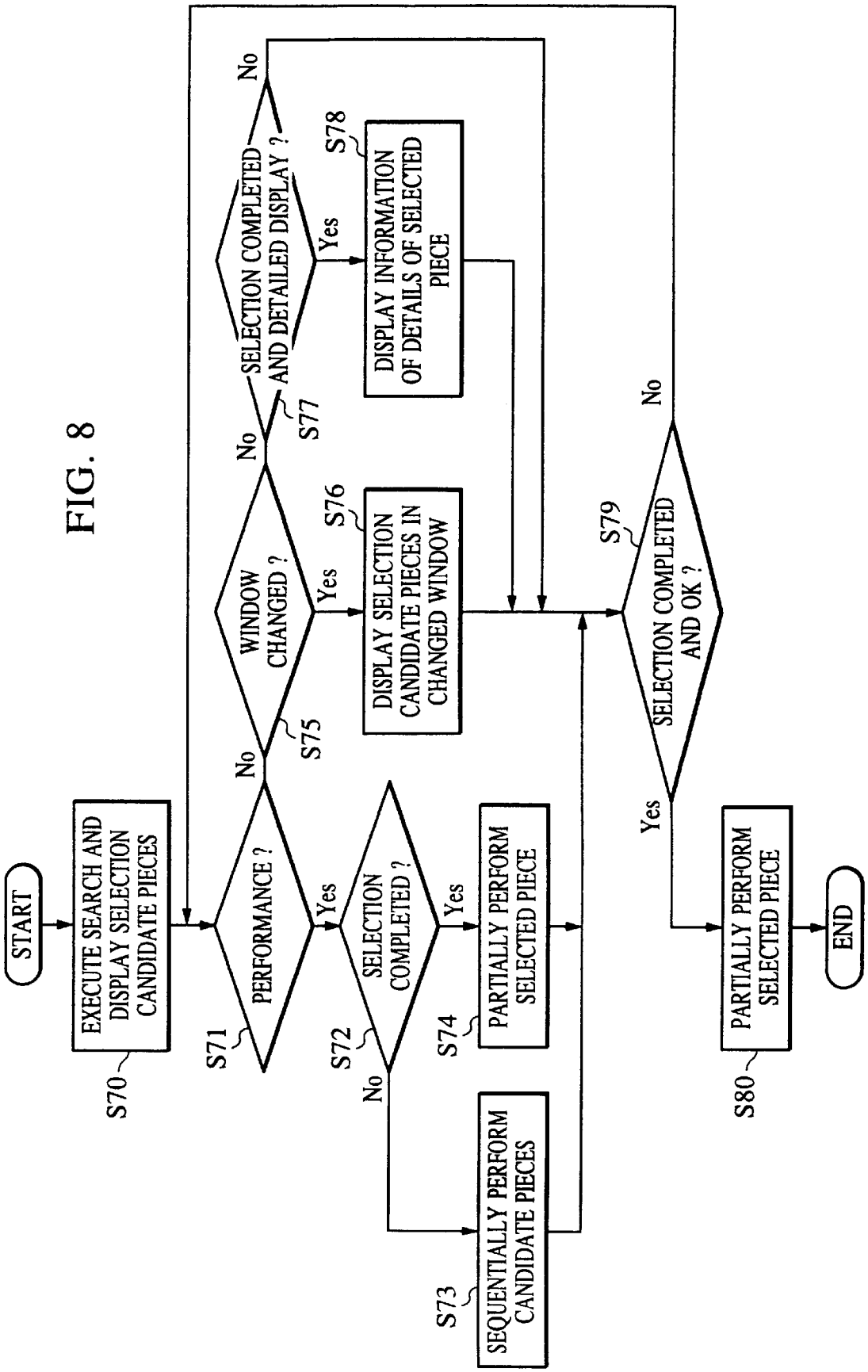
FIG. 8 is a flowchart of the operation in a selecting routine.
Figure 9:
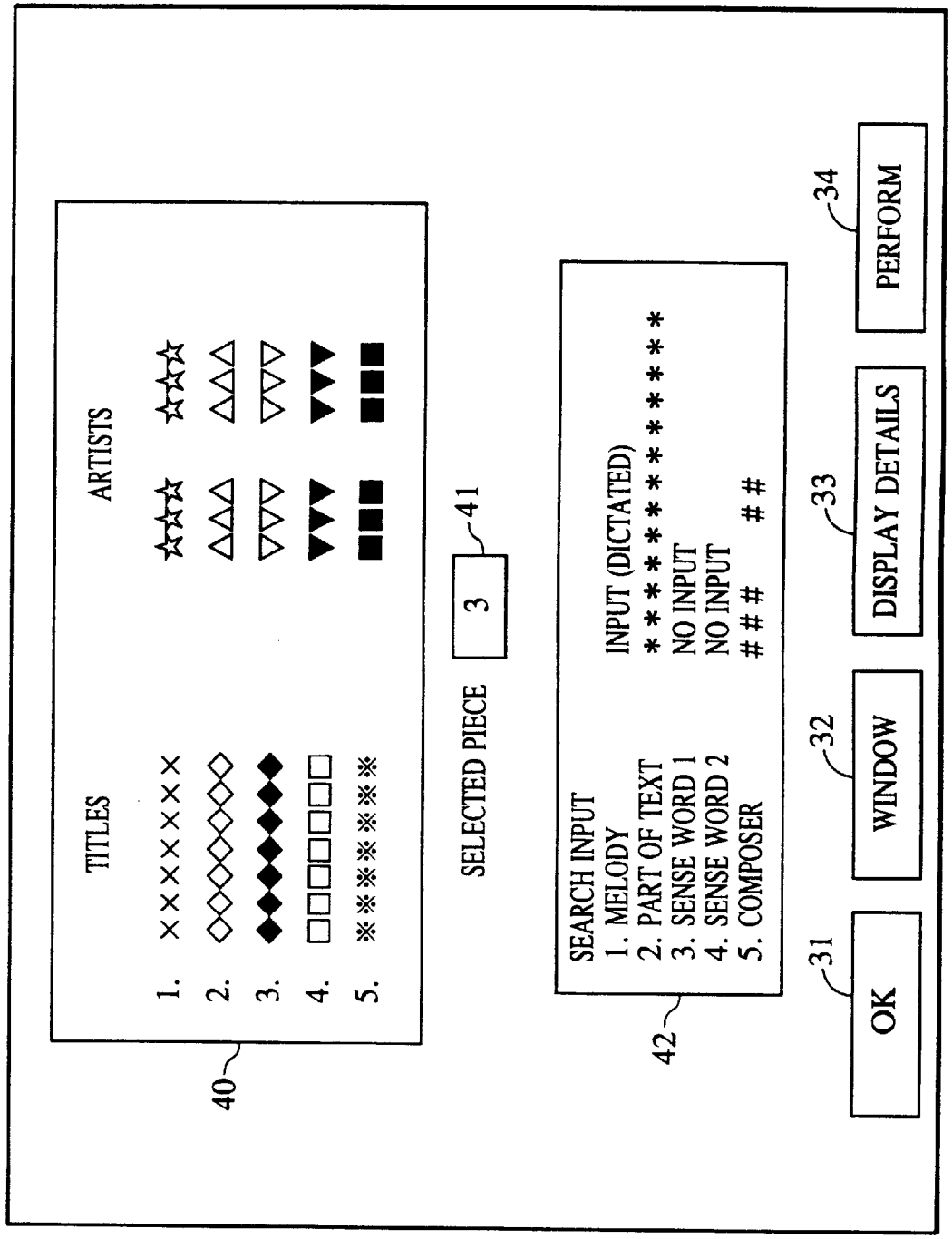
FIG. 9 is a diagram showing a candidate piece list display window used in the selecting routine.
Figure 10:
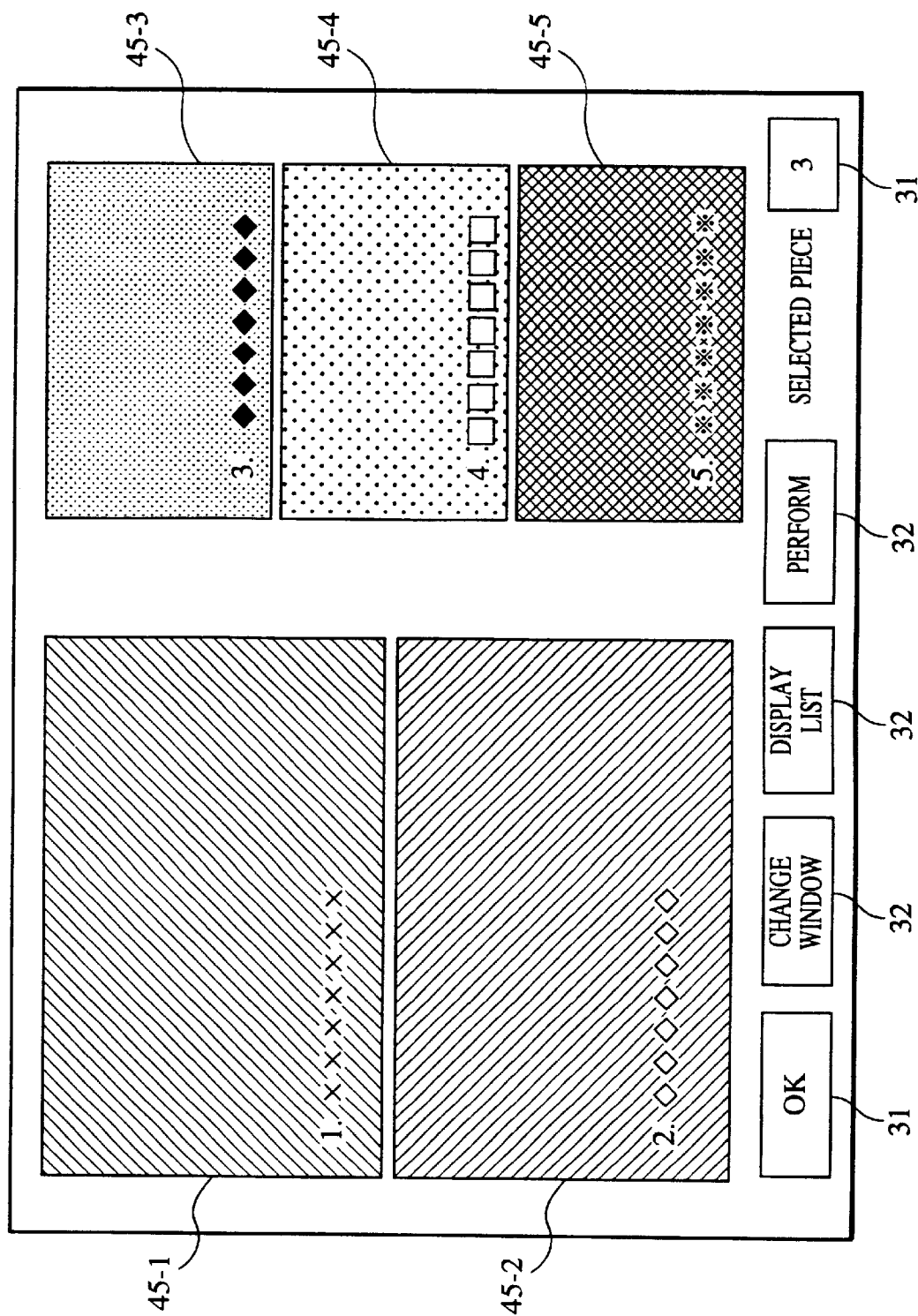
FIG. 10 is a diagram showing an image and title display window used in the selecting routine.
Figure 11:
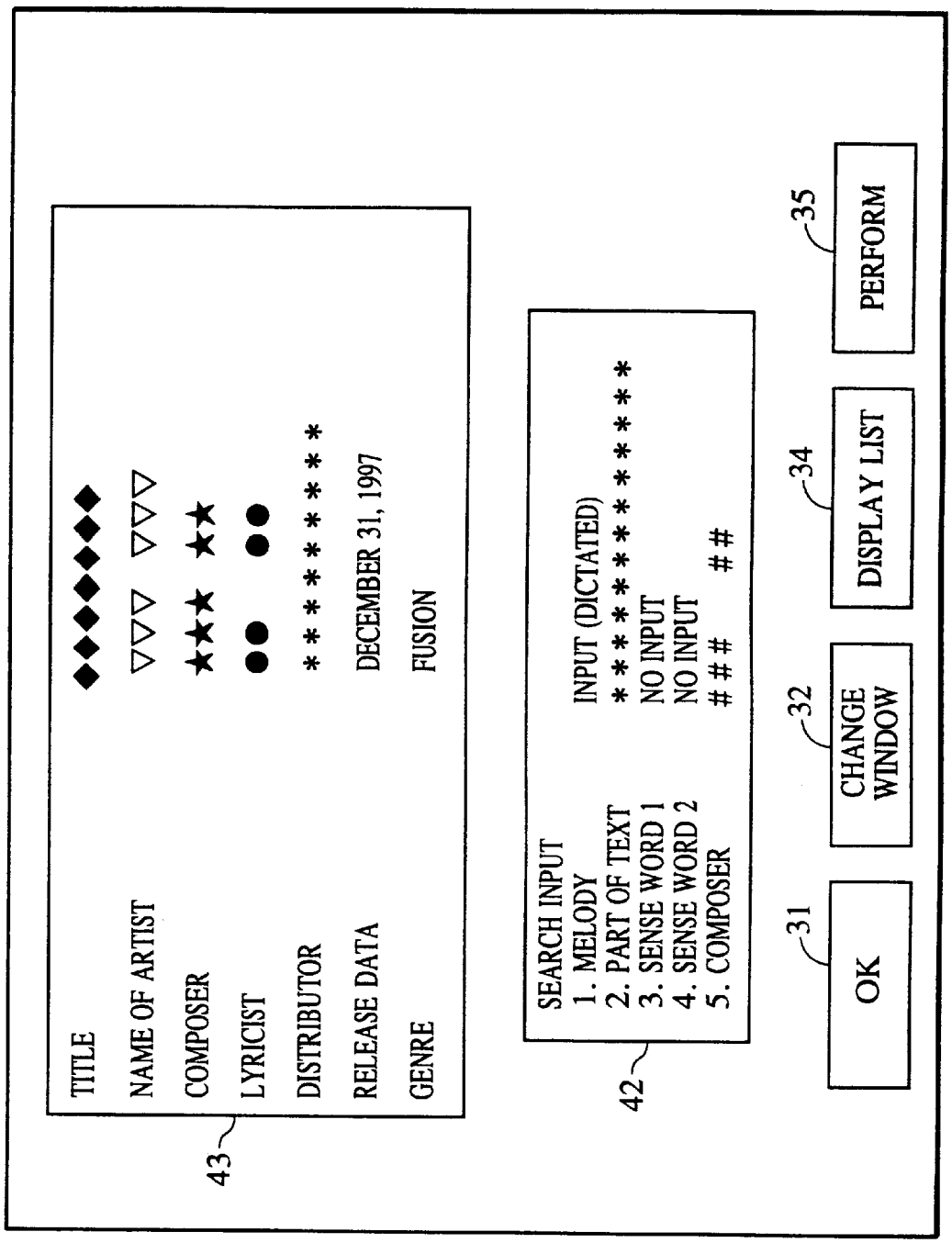
FIG. 11 is a diagram showing a candidate piece detail display window used in the selecting routine.

The selecting routine in which search results are presented and the desired piece is selected from the presented search results (candidate pieces) will next be described. FIG. 8 is a flowchart for explaining the operation of the system in the selecting routine. FIGS. 9 to 11 are diagrams showing display windows displayed on the display in the selecting routine shown in FIG. 8. The operation will be described with reference to these display windows.

When the selecting routine (S11, S13, S15, S22, S24, S26, S32, S34, S36) in the flowchart shown in FIG. 2 is started, search for candidate pieces is performed by using search factors already input in the above-described request routine (S70). Several of candidate pieces thereby selected are displayed in each of display modes. Ranking of candidate pieces in searching will first be described.

In searching for candidate pieces in step S70, with respect to some of the search factors with ambiguity, e.g., score information, search objects are assumed to be not only those completely matching the search factor but also those evaluated in the degree of matching between a higher degree and a lower degree. With respect to input of a word which denotes a sense, musical pieces are also evaluated by examining closeness of characteristics of the musical pieces to the sense word.

For example, the degree of matching to score information may be evaluated as a value (x) between 0 and 1, and the degree of similarity to a sense word may be evaluated as a value (y) between 0 and 1. In this case, $z=x*y$ is calculated and musical pieces which coincide with bibliographical information are ranked in the order of the magnitude of the value z. The musical piece highest in rank, the musical piece next highest in rank, . . . are presented in the form set in the candidate piece display-form display portion 14 of the above-described initialization window (see FIG. 4) within the range of the number of presented pieces set in the presented musical piece number display portion 12 of the initialization window.

For example, in a case where list display initialization is performed as shown in FIG. 4 and where the number of presented pieces is set to "5", a window such as shown in FIG. 9 is displayed. In a candidate piece list display portion 40 of the window shown in FIG. 9, titles of musical pieces and names of artists are displayed by being ranked as described above. In a selected piece display portion 41, the rank of one of the candidate pieces selected by the user is displayed. In a search condition display portion 42, conditions of the search for the candidate piece displayed in the display portion 40 are displayed.

When in this situation the user inputs one of the candidate pieces to the selected piece display portion 41 and clicks an OK key 31 shown in FIG. 9 (S79), the selection of the candidate piece is completed. Step 79 in FIG. 8 corresponds to steps S12, S14, S16, S23, S25, S27, S33, and S37 shown in FIG. 2.

If a plurality of display windows, including an "image and title" display window, other than the above-mentioned "title and artist list" display, are prepared, the corresponding display forms are presented below a window change key 32 when the user clicks the key 32, thereby enabling the user to select one of the display forms (S75). A display in the selected display form is made (S76).

For example, if the "image and title" display window is selected, it is displayed as shown in FIG. 10. The window shown in FIG. 10 has display portions 45-1 and 45-5 for displaying images stored in the MDB along with the corresponding candidate pieces. The rank numbers and the titles are displayed by being superimposed on the corresponding images, as illustrated. The keys 31 and 32 have the same functions as the corresponding keys 31 and 32 shown in FIG. 9. When a "list display" key 34 is clicked, the window shown in FIG. 9 is displayed again by steps S75 and S76, as it is when selected by clicking the window change key 32.

If the user inputs one of the candidate pieces to the selected piece display portion 41 and clicks a detail display key 33 while the window shown in FIG. 9 is being displayed, a window such as shown in FIG. 11 is displayed. That is, detailed information about the selected candidate piece, e.g., the one shown in FIG. 9 is displayed in a detailed information display portion 43. The same search condition display portion 42 as that described above is provided. Keys 31, 32, and 34 in this window have the same functions as the corresponding keys 31, 32, and 34 shown in FIG. 10.

If a performance key 35 is clicked (S71) when the window shown in FIGS. 9, 10, or 11 is displayed, a determination is made as to whether one of the candidate pieces has been input to the selected piece display portion 41 (S71). If an input has been accepted, that is, the selection has been completed, audio information corresponding to a passage in the selected musical piece is obtained from the MDB or via communication interface 2 and is sent to the speaker 5 to be output as a performance.

In the case where the performance key 35 is clicked in the detailed information display window shown in FIG. 11, a passage in the selected piece, already selected from the candidate pieces, is naturally performed. If none of the candidate pieces is input to the selected piece display portion 41 (S72), the presented candidate pieces are successively performed (S73).

In the system of this embodiment, the above-described partial performance or successive performance function enables the user to confirm whether the melody that occurred in his or her mind has been input to the system. When the window shown in FIGS. 9, 10, or 11 is displayed, the input search conditions are presented in the window to give the user a chance to consider addition of a further input or correction of the existing inputs.

If the user clicks the above-mentioned OK key by referring to such auxiliary musical piece selection information, the selection of one of the musical pieces is completed (S79), and a performance of the selected piece is given again (S80). The system is then set in such a state as to be able to perform the entire selected piece.

In this state, the bibliographical information is displayed in the above-mentioned bibliographical information display section 43 on the display 6 along with letters "DO YOU WANT TO HEAR WHOLE TUNE ??". The user clicks the cancel key 38 or the performance key 39 to determine cancellation or performance of the entire piece (step S20, S30, or S39). That is, if the performance key 39 is clicked to perform the entire piece, the musical performance routine (S40) shown in FIG. 2 is started and the selected musical piece is performed by accessing the MDB containing the musical piece.

The user may click the cancel key 38 if the presented musical piece is not the desired piece or if the cost is excessively high, thereby starting the next request routine (S20, S30). If the user selects no musical piece in each request routine or in each selecting routine (S16, S27, S37), the user is asked whether he or she will make the next request (S17, S28, S38). If the user will not make the next request, the operation of the system is terminated. The same asking is also performed (S41) when the performance of the musical piece in the musical performance routine is completed. If the user will not make the next request thereafter, the operation of the system is terminated.

In the above-described system, if the user needs a whole-tune performance, and if the selected musical piece exists in the MDB in the system with a system address, the performance is started immediately. Since the system presents to the user the place where the musical piece exists, the user can also reproduce the musical piece by different means. In the case of absence of the desired piece in the MDB in the system, the user may take an auxiliary procedure for downloading the desired data based on a display of a data base containing the musical piece.

In this embodiment, a single MDB is assumed as a musical piece source. However, needless to say, any of other various media, such as compact discs, mini discs, a magnetic tapes, LP records, and SP records, can be incorporated in the system. Other audio and video media, such as laser disks, MIDI communication karaoke systems, video tapes, digital versatile discs, can also be incorporated as musical piece sources for the system of the present invention.

As described above, in the system of the above-described embodiment, a user who cannot remember the title of a musical piece but who can remember fragments of melody, relating information, etc., can easily search for the necessary musical piece by the dialogical process using the dialogical multimedia interface with the system.

In particular, the dialogical interface with the system is arranged to enable users to perform a natural dialogical process without any considerable burden, such that an initialization according to a user's preference is first performed and a pattern of use by each user is then learnt, thus minimizing troublesome mutual actions and difficulty of obtaining the desired result each time the system is used.

Needless to say, the system of the present invention can be used not only for searching for a musical piece which slipped out of a person's memory, but also for searching for musical pieces generally in other various situations.

As described above, if the music search system, the music search method or the recording medium of the present invention is used, a user can efficiently supply the system with various sorts of information for searching for a musical piece, and can obtain an optimal search result by using a search method particularly suitable for search by each sort of information. Also, the user can immediately confirm most ambiguous score information when using the score information as search information, thereby reducing the probability of the system making an unnecessary search.

Further, by using the music search system, the music search method or the recording medium of the present invention, a user can recognize candidate musical pieces in various forms, from which the user will select, by various methods, one which he or she needs. Thus, the user can select any musical piece in an optimal way according to his or her preference.

The degrees of matching of a plurality of candidate pieces to each of musical piece search factors are evaluated and information relating to the results of the evaluation is simultaneously displayed. The system arranged to have this function can suggest, to a user, musical pieces from which one searched for by the user is probable to be found. Also, the system is substantially free from selecting failure.

Further, a plurality of candidate pieces is displayed along with musical piece search factors to suggest to a user redoing selection from the candidate pieces, thereby reducing user's chances of making an unnecessary search.

While the present invention has been described with respect to what presently is considered to be the preferred embodiment, it is to be understood that the invention is not limited to the described embodiment. To the contrary, the present invention is intended to cover various modifications and equivalent arrangements included within the spirit and the scope of the appended claims. The scope of the following claims is to be accorded the broadest interpretation so as to encompass all such modifications and equivalent structures and functions.

What is claimed is:

1. A system for searching one or more music data from a database, the system comprising:
    an input device which inputs at least one search factor; and
    a processor which searches one or more music data from a database using the inputted search factor, evaluates a matching degree of each of the searched music data, and displays information representing each of the searched music data on a display in order of a ranking of the matching degree of each of the searched music data.

2. A system according to claim 1, wherein one of the search factors is a melody of the desired music.

3. A system according to claim 1, wherein the processor displays information representing each inputted search factor on the display together with the information representing each of the searched music data.

4. A system according to claim 2, wherein said presentation means ranks the plurality of candidate pieces according to the degrees of matching, and displays the candidate pieces together with ranks determined by said ranking.

5. A system according to claim 1, wherein the processor displays detailed information about one of the searched music data selected by user.

6. A method of searching one or more music data from a database, the method comprising the steps of:
    searching one or more music data from a database using at least one search factor;
    evaluating a matching degree of each of the searched music data; and
    displaying information representing each of the searched music data on a display in order of a ranking of the matching degree of each of the searched music data.

7. A method according to claim 6, wherein one of the search factors is a melody of the desired music.

8. A method according to claim 6, wherein the displaying step includes displaying information representing each inputted search factor on the display together with the information representing each of the searched music data.

9. A method according to claim 6, wherein the displaying step includes displaying detailed information about one of the searched music data selected by user.

10. A medium storing a program which performs a method of searching one or more music data from a database, the method comprising the steps of:
    searching one or more music data from a database using at least one search factor;
    evaluating a matching degree of each of the searched music data; and
    displaying information representing each of the searched music data on a display in order of a ranking of the matching degree of each of the searched music data.

11. A medium according to claim 10, wherein one of the search factors is a melody of the desired music.

12. A medium according to claim 10, wherein the displaying step includes displaying information representing each inputted search factor on the display together with the information representing each of the searched music data.

13. A medium according to claim 10, wherein the displaying step includes displaying detailed information about one of the searched music data selected by user.

* * * * *